US010509913B2

(12) United States Patent
Mashimo (10) Patent No.: US 10,509,913 B2
(45) Date of Patent: Dec. 17, 2019

(54) IMAGE FORMING SYSTEM AND IMAGE FORMING METHOD THAT EXECUTE MASKING PROCESS ON CONCEALMENT REGION, AND RECORDING MEDIUM THEREFOR

(71) Applicant: KYOCERA Document Solutions Inc., Osaka (JP)

(72) Inventor: Takayuki Mashimo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 234 days.

(21) Appl. No.: 15/799,476

(22) Filed: Oct. 31, 2017

(65) Prior Publication Data
US 2018/0129815 A1   May 10, 2018

(30) Foreign Application Priority Data
Nov. 10, 2016   (JP) .................................. 2016-220074

(51) Int. Cl.
*G06F 21/60* (2013.01)
*G06F 21/31* (2013.01)
(Continued)

(52) U.S. Cl.
CPC .......... *G06F 21/608* (2013.01); *G06F 3/1222* (2013.01); *G06F 3/1237* (2013.01);
(Continued)

(58) Field of Classification Search
CPC .................................................. G06F 21/608
See application file for complete search history.

(56) References Cited

U.S. PATENT DOCUMENTS

2009/0281797 A1* 11/2009 Zopf .................... G10L 19/005
  704/207
2011/0063685 A1   3/2011 Suzuki .......................... 358/3.28
(Continued)

FOREIGN PATENT DOCUMENTS

CN   102024246 A   4/2011
JP   10-126607 A   5/1998
(Continued)

OTHER PUBLICATIONS

Chinese Office Action dated Mar. 19, 2019, issued by the National Intellectual Property Administration in corresponding application CN 201710994969.9.
(Continued)

*Primary Examiner* — Ali Shayanfar
(74) *Attorney, Agent, or Firm* — Stein IP, LLC (57) ABSTRACT

An image forming system includes a concealment word registration unit, an ID information acquisition unit, a concealment word managing unit, and an image forming unit. The concealment word registration unit registers a concealment word associating with a user. The ID information acquisition unit obtains creator ID information and execution person ID information from a print job, the creator ID information identifies a user as a creator of a document file, the execution person ID information identifies a user as an execution person of the image formation process. The concealment word managing unit uses the concealment words to determine a concealment region. The concealment words include the concealment word associated with the user identified by the creator ID information and the concealment word associated with the user identified by the execution person ID information. The image forming unit executes a masking process that makes the concealment region illegible.

7 Claims, 4 Drawing Sheets

(51) Int. Cl.
  *G06F 21/62* (2013.01)
  *G06F 3/12* (2006.01)
  *G07C 9/00* (2006.01)

(52) U.S. Cl.
  CPC .......... *G06F 3/1238* (2013.01); *G06F 3/1285* (2013.01); *G06F 21/31* (2013.01); *G06F 21/62* (2013.01); *G07C 9/00007* (2013.01)

(56) References Cited

U.S. PATENT DOCUMENTS

| | | | | |
|---|---|---|---|---|
| 2013/0088740 | A1* | 4/2013 | Nishimura | G03G 15/0863 358/1.14 |
| 2014/0211860 | A1* | 7/2014 | Zhao | H04N 19/172 375/240.27 |
| 2014/0254938 | A1* | 9/2014 | Gu | G06T 5/002 382/199 |
| 2016/0162679 | A1* | 6/2016 | Lin | G06F 21/36 726/28 |
| 2017/0154207 | A1* | 6/2017 | Sasaki | G06F 21/6245 |

FOREIGN PATENT DOCUMENTS

| | | |
|---|---|---|
| JP | 2004-213376 A | 7/2004 |
| JP | 2005-141483 A | 6/2005 |
| JP | 2009-218836 A | 9/2009 |
| JP | 2012-49860 A | 3/2012 |

OTHER PUBLICATIONS

Japanese Office Action dated Jun. 27, 2019, issued by the Japanese Patent Office in corresponding application JP 2016-220074.
Chinese Office Action dated Oct. 21, 2019, issued by the National Intellectual Property Administration in corresponding application CN 201710994969.9.

* cited by examiner

IMAGE FORMING SYSTEM AND IMAGE FORMING METHOD THAT EXECUTE MASKING PROCESS ON CONCEALMENT REGION, AND RECORDING MEDIUM THEREFOR

INCORPORATION BY REFERENCE

This application is based upon, and claims the benefit of priority from, corresponding Japanese Patent Application No. 2016-220074 filed in the Japan Patent Office on Nov. 10, 2016, the entire contents of which are incorporated herein by reference.

BACKGROUND

Unless otherwise indicated herein, the description in this section is not prior art to the claims in this application and is not admitted to be prior art by inclusion in this section.

Recently, spread of personal information protection and My-Number requires improvement of secrecy of confidential information on a printed matter. From this aspect, when print data includes confidential information desired not to be seen by others, the information is masked to be kept secret. For example, there has been proposed a technique where, when a document is retrieved by a scanner, a part to be kept secret in the document is preliminarily marked with a specific color so as to print the part marked with the specific color with a black painting. On the other hand, there has been proposed another technique where keywords to be kept secret are registered in a dictionary and, when print data includes a keyword found to be matched, a part indicating the keyword is blotted out.

SUMMARY

An image forming system according to one aspect of the disclosure includes a concealment word registration unit, an ID information acquisition unit, a concealment word managing unit, and an image forming unit. The concealment word registration unit registers a concealment word associating with a user, the concealment word is desired to be concealed in an image formation process. The ID information acquisition unit obtains creator ID information and execution person ID information from a print job, the creator ID information identifies a user as a creator of a document file, the document file is a target of the image formation process, the execution person ID information identifies a user as an execution person of the image formation process. The concealment word managing unit uses the concealment words to determine a concealment region based on an input from the user identified by the execution person ID information, the concealment words include the concealment word associated with the user identified by the creator ID information and the concealment word associated with the user identified by the execution person ID information, the concealment region is a region to be concealed in an image, the image is generated using the print job. The image forming unit executes a masking process to form an image on which the masking process has been performed, the masking process makes the concealment region illegible.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes aspects to embody the disclosure (hereinafter referred to as "embodiments") with reference to the drawings.

Figure 1:
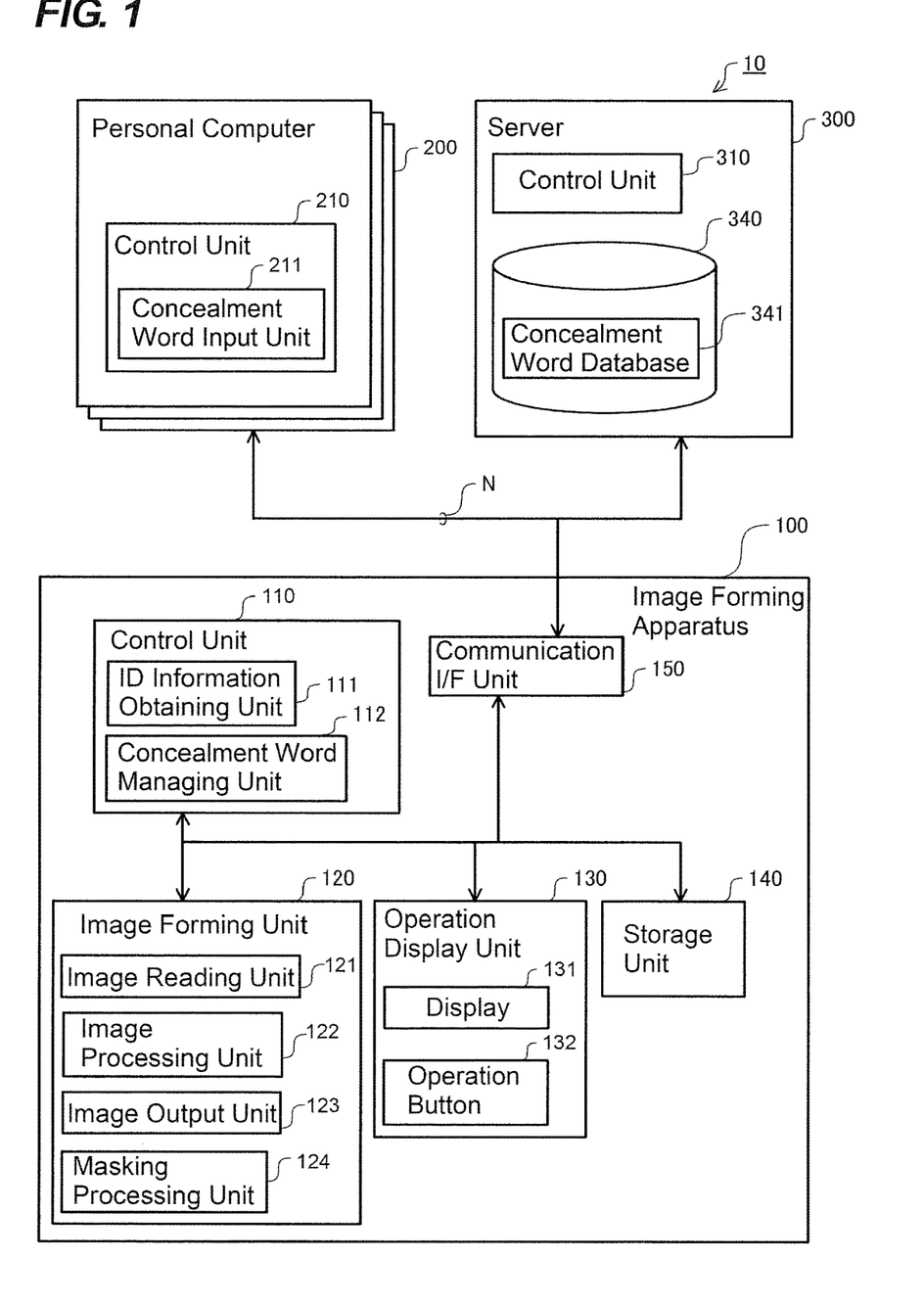
FIG. 1 illustrates a block diagram illustrating a functional configuration of a security printing system according to one embodiment of the disclosure.

FIG. 1 illustrates a block diagram illustrating a functional configuration of a security printing system 10 according to one embodiment of the disclosure. The security printing system 10 includes an image forming apparatus 100 as a Multifunction Peripheral (MFP), a plurality of personal computers 200, and a server 300. The image forming apparatus 100 is connected to the plurality of the personal computers 200 and the server 300 via a wired network N. The security printing system 10 is also referred to as an image forming system.

The plurality of the personal computers 200 each include a control unit 210. The control unit 210 includes a concealment word input unit 211. The server 300 includes a control unit 310 and a storage unit 340. The storage unit 340 stores a concealment word database 341. The concealment word database 341 is also referred to as a concealment word registration unit.

The image forming apparatus 100 includes a control unit 110, an image forming unit 120, an operation display unit 130, a storage unit 140, and a communication interface unit 150. The control unit 110 includes an ID information acquisition unit 111 and a concealment word managing unit 112. Functions of the ID information acquisition unit 111 and the concealment word managing unit 112 will be described later.

The control units 110, 210 and 310 include: a main storage unit such as a RAM and a ROM; and control units such as a Micro Processing Unit (MPU) and a Central Processing Unit (CPU). The control unit 110 has a controller function related to interfaces, such as various I/Os, a universal serial bus (USB), a bus, and another hardware. The control units 110, 210 and 310 entirely control the image forming apparatus 100, the personal computer 200, and the server 300 respectively.

The image forming unit 120 includes an image reading unit 121, an image processing unit 122, and an image output unit 123, and a masking processing unit 124. The image reading unit 121 reads an image from a document to create image data. The image processing unit 122 processes the image data in accordance with a print setting. The image output unit 123 executes printing on a recording medium to output. A function of the masking processing unit 124 will be described later.

The operation display unit 130 includes a display 131 and an operation button 132. The display 131 is configured as a liquid crystal panel that includes a backlight. The operation display unit 130 accepts an operation input by a user from the display 131, which functions as a touch panel, and various kinds of buttons and switches (not illustrated).

The storage units 140 and 340 are each a storage device constituted of a hard disk drive, a flash memory, or a similar medium, which are non-transitory recording media, and store control programs and data for processes executed by the control units 110 and 310 respectively.

Figure 2:
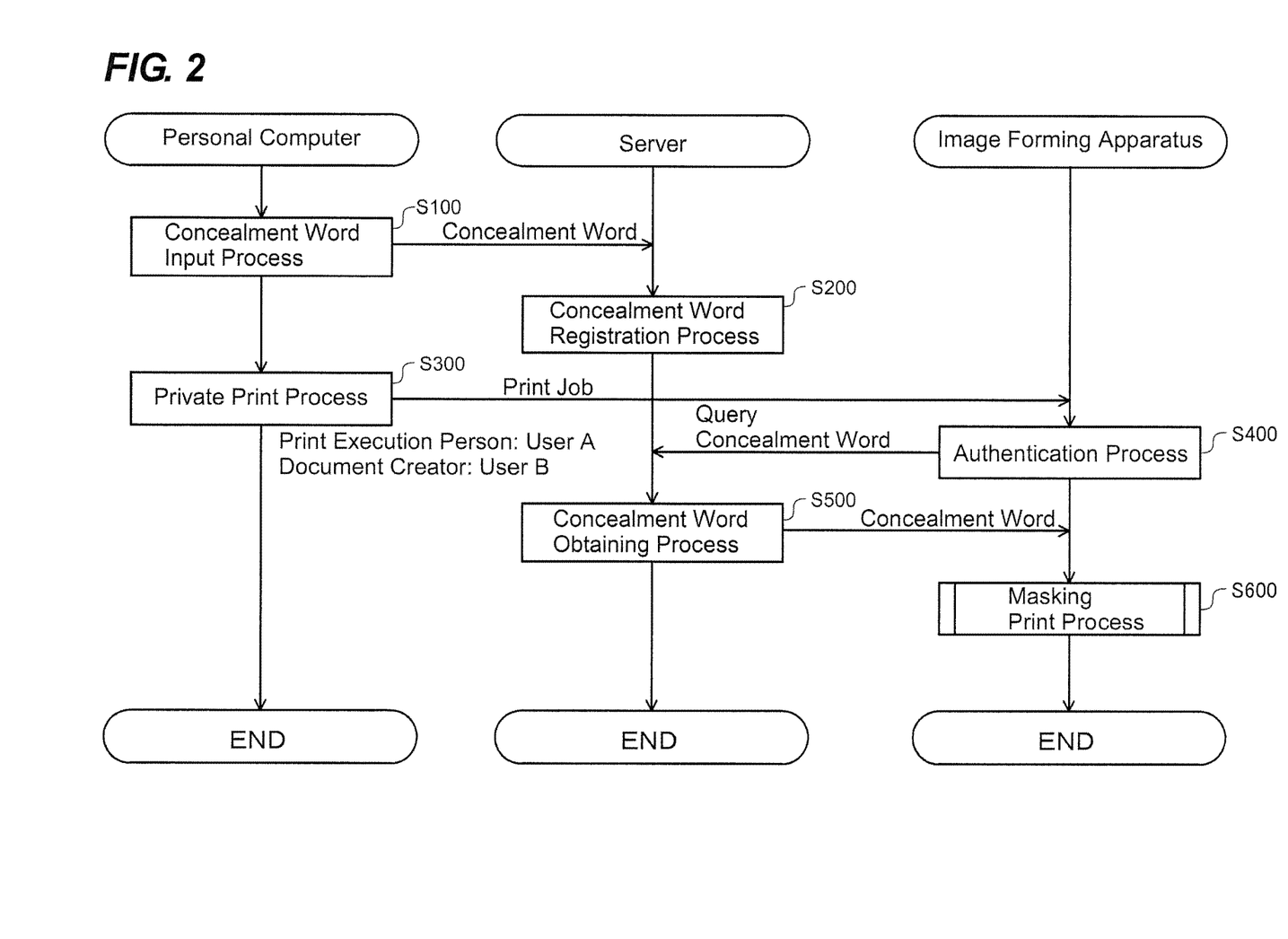
FIG. 2 illustrates a procedure for a security print process according to the one embodiment.

FIG. 2 illustrates a procedure for a security print process according to the one embodiment. The security print process is executed by a cooperation of the image forming apparatus 100, the personal computer 200, and the server 300.

In Step S100, the concealment word input unit 211 of the personal computer 200 indicates a user interface screen (not illustrated) for registering concealment words on a display (not illustrated) of the personal computer 200. A user of the personal computer 200 uses the user interface screen to input information that the user wants to conceal (information that the user considers to be secret, for example, personal information of the user and other information). The concealment word input unit 211 transmits the concealment words input via the network N to the server 300.

In Step S200, the server 300 registers the transmitted concealment words in the concealment word database 341 associating with each of users A to C of three personal computers 200. In the concealment word database 341, the users A to C available for the security printing system 10 are preliminarily registered.

Keywords to be registered by the users A to C in advance are assumed to be personal information typified by an address, a name, and a My-Number, and various kinds of information such as a name of a technique, a project name, management information, and values of respective parameters (for example, profit and performance improvement rate) corresponding to technical information, which are desired to be concealed for departments to which the users A to C belong.

Then, the security printing system 10 ensures registering the concealment words desired to be concealed in the image formation process by the image forming apparatus 100 associating with the users A to C.

Thus, the users of the plurality of the personal computers 200 are allowed to preliminarily register the concealment words in the concealment word database 341 stored in the storage unit 340 of the server 300. The concealment words registered in the concealment word database 341 are available in the image forming apparatus 100 for printing by any user. This example assumes that the users A to C of the three personal computers 200 are each allowed to use the image forming apparatus 100 for printing.

In Step S300, the user A operates the personal computer 200 to execute a private print. Assume that, in the private print, the user A prints a document file whose creator is the user B. The creator is the user B means that the document file is last updated by the user B. Assume that locking by a password and using a version management tool restricts the document file to be edited so as to prevent the person who last updated from being changed.

Then, the personal computer 200 of the user A transmits a print job generated based on the document file to the image forming apparatus 100. The print job includes document data indicating a document indicated by the document file, creator ID information identifying the user B as the creator of the document file, execution person ID information identifying the user A as an execution person of the image formation process by the print job, and information indicating that the print job type is the private print.

In Step S400, the user A goes to the image forming apparatus 100 to execute an authentication process, because, in the private print, printed matters are output corresponding to an authentication operation on the image forming apparatus 100 by the user A as a sender of the print job. In the authentication process, the user A operates the operation display unit 130, selects the print job, and inputs a password that the user A has. The control unit 110 performs a process as an authentication success when the execution person is confirmed to be the user A identified by the execution person ID information.

The ID information acquisition unit 111 of the image forming apparatus 100 obtains the creator ID information and the execution person ID information from the print job. The ID information acquisition unit 111 uses the obtained creator ID information and execution person ID information to refer to the server 300 for the concealment word.

In Step S500, the control unit 310 of the server 300 executes a concealment word obtaining process. In the concealment word obtaining process, the control unit 310 uses the execution person ID information (identifying the user A) and the creator ID information (identifying the user B) to obtain the concealment word associated with the user A and the concealment word associated with the user B. The server 300 transmits the obtained concealment word to the image forming apparatus 100.

In Step S600, the image forming apparatus 100 executes a masking print process. The masking print process is a process that performs a masking on a predetermined concealment word to perform printing. The masking means that a method of a black painting or another method is used to make a concealment region as a region that indicates the concealment word illegible. To make illegible means to perform a process where not only the black painting but also a white painting (not printing), a blurring, a low contrast, adding a grid line, a mosaic, a digital watermark, and similar method is used to make the region illegible, and means to perform a process of not only making illegible but also obfuscations and similar process corresponding to a security level.

The concealment word managing unit 112 of the image forming apparatus 100 determines whether the document data as a print target includes the obtained concealment word. When the document data does not include the concealment word, the concealment word managing unit 112 terminates the masking print process, thus automatically switching to an ordinary print process.

Searching the concealment word ensures being achieved by executing a pattern matching on, for example, rasterized data. Furthermore, the print job may include a searchable text file as metadata of the document data. The search target is not only the concealment word itself, but the control unit 110 may use a preliminarily configured algorithm to include keywords associated from the concealment word in the search target.

Specifically, for example, when the concealment words of the departments to which the users A to C belong include "accounting information," a concealing list may be constituted of words of sales, profit, profit margin, and similar word, and values of the words. Furthermore, for example, when the concealment words of the creator of the document file include "light amount correction," sentences and paragraphs including the words of the "light amount correction" may be included in the masking target. The concealment word based on the association may be indicated on the operation display unit 130 on the execution of printing so as to cause the user to confirm the discrimination to be right or wrong. Thus, the concealment word managing unit 112 is simply a unit that uses the concealment words to determine the concealment region as a region to be concealed in the image generated using the print job.

When the digital watermark is used, the masking process may be configured such that the information can be restored when the printed matter is scanned again. In this case, it is also possible to control whether the restoration is locked based on the ID of the execution person of the scan. The concealment word managing unit 112 is configured to encrypt a management number and the masked information to embed in the image with the method such as a barcode and a QR code (registered trademark) on a margin of the printed matter even in the case of the simple black painting, thus ensuring the restoration on scanning the image.

Specifically, the concealment word managing unit 112 is configured to use at least any one of a predetermined code and the digital watermark to encrypt the confidential information indicated on the concealment region, so as to embed in the image. The image forming unit 120 is configured to form the image on the print medium to output. The user can login the image forming apparatus 100 and remove the black painting to restore the confidential information in reading an original image from the document as the print medium output using the image reading unit 121 to generate the original image data.

However, restorable confidential information is the concealment word associated with a user who has subordinate authority than an authority of a user identified by reader ID information. The reader ID information is information identifying the user as the execution person of reading the original image, and obtained using the user input for the authentication on logging in. In the restoration of the confidential information, the image forming apparatus 100 is also configured to indicate the user interface screen querying whether to restore the concealment word so as to perform the restoration corresponding to the input on the user interface screen.

Figure 3:
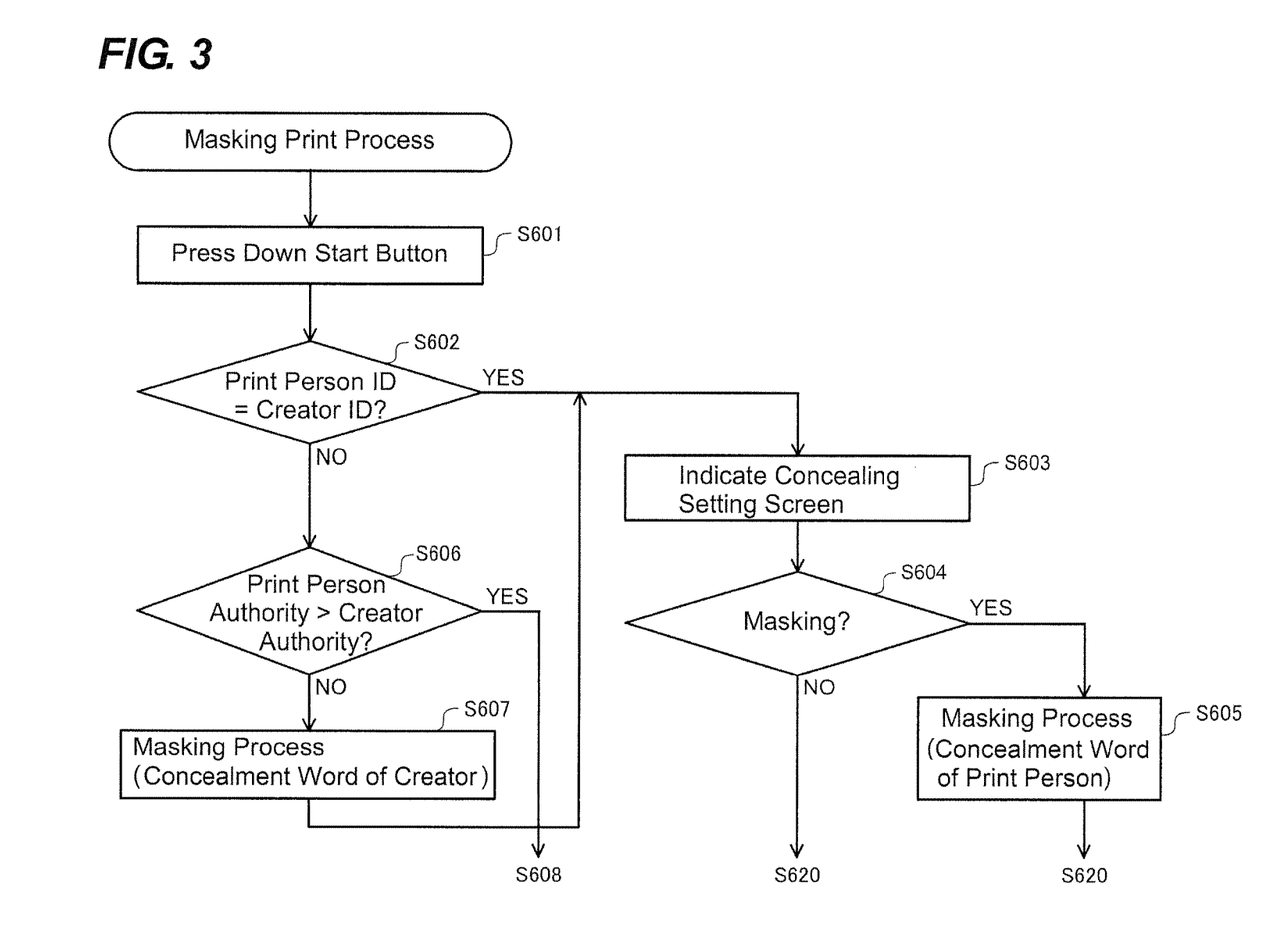
FIG. 3 illustrates a procedure for a masking print process according to the one embodiment.
Figure 4:
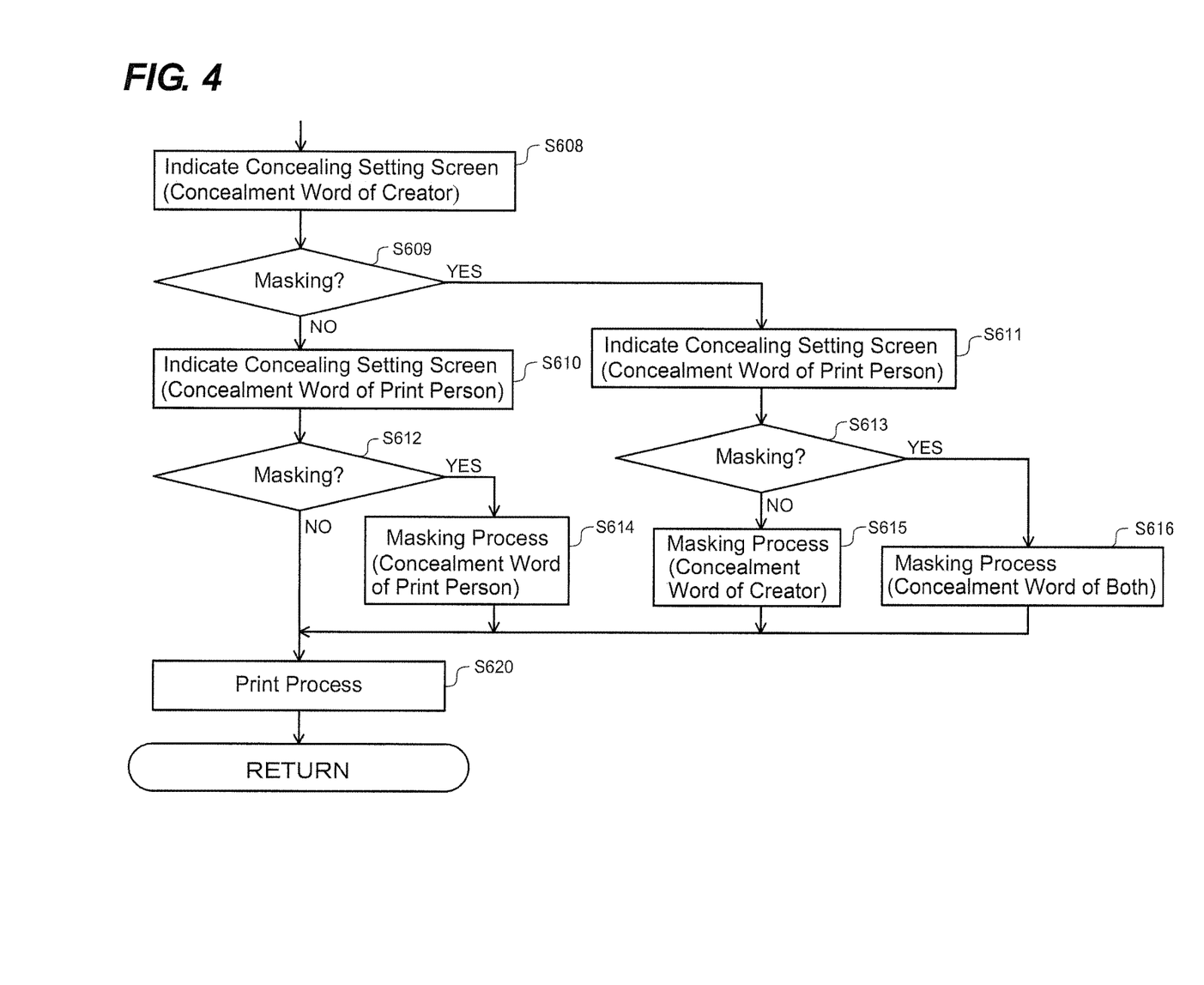
FIG. 4 illustrates a procedure for the masking print process according to the one embodiment.

FIG. 3 and FIG. 4 illustrate a procedure for the masking print process (Step S600) according to the one embodiment. In Step S601, the user A presses down a start button (not illustrated) included in the operation display unit 130 of the image forming apparatus 100.

In Step S602, the concealment word managing unit 112 determines whether the execution person ID information matches the creator ID information, that is, whether a print execution person (also referred to as simply a print person) and a document creator (also referred to as simply a creator) are identical. Based on the determination, the concealment word managing unit 112 advances the process to Step S603 in the case of the identical user, and advances the process to Step S606 in the case of not the identical user.

In this example, since the print person (the user A) is not identical to the creator (the user B), the process proceeds to Step S606. However, for easy explanations, a description will be given of a case where the print person is identical to the creator, and subsequently, a description will be given of a case where the print person is not identical to the creator.

In Step S603, the image forming apparatus 100 indicates a concealing setting screen as the user interface screen on the operation display unit 130. This ensures the image forming apparatus 100 to call the attention of the user as the print person that the document as the print target includes the concealment word. The concealing setting screen includes an icon display (not illustrated) querying whether to mask the concealment word.

In Step S604, the concealment word managing unit 112 advances the process to Step S605 corresponding to the input to perform the masking process, and advances the process to Step S620 (print process) corresponding to the input not to perform the masking process.

In Step S605, the masking processing unit 124 executes the masking process on the concealment word of the print person. In the masking process, the masking processing unit 124 uses the black painting or similar method to make the concealment region associated with the print person (identical to the creator) illegible in the document data.

On the other hand, in Step S606, the concealment word managing unit 112 determines whether the print person is a superior authorized person compared with the creator. In this embodiment, assume that the authority of the users A to C is registered in the concealment word database 341. The determination is made using the execution person ID information and the creator ID information. Based on the determination, the concealment word managing unit 112 advances the process to Step S608 when the print person is the superior authorized person compared with the creator, and advances the process to Step S607 when the print person is not the superior authorized person compared with the creator.

In Step S607, the masking processing unit 124 executes the masking process on the concealment word of the creator. Since the print person is not the superior authorized person compared with the creator, the print person does not have the authority to determine whether to execute the masking process, thus the masking process is automatically (that is, forcibly) executed on the concealment word of the creator by the authority of the creator.

After the execution of the masking process on the concealment word of the creator, the concealment word managing unit 112 advances the process to Step S603. This ensures the print person to execute the masking process on the concealment word of the print person corresponding to the determination based on the own authority. The masking process may be executed on the concealment word of the creator or the concealment words of both the creator and the print person after the determination in Step S604.

In Step S608 (see FIG. 4), the concealment word managing unit 112 indicates the concealing setting screen as the user interface screen on the operation display unit 130 of the image forming apparatus 100. This ensures the image forming apparatus 100 to call the attention of the user as the print person that the document as the print target includes the concealment word of the creator.

In Step S609, the concealment word managing unit 112 advances the process to Step S611 corresponding to the input to perform the masking process, and advances the process to Step S610 corresponding to the input not to perform the masking process.

In Step S610, the concealment word managing unit 112 indicates the concealing setting screen as the user interface screen on the operation display unit 130 of the image forming apparatus 100. This causes the image forming apparatus 100 to call the attention of the user as the print person that the document as the print target includes the concealment word of the print person.

In Step S612, the concealment word managing unit 112 advances the process to Step S614 corresponding to the input to perform the masking process, and advances the process to Step S620 corresponding to the input not to perform the masking process. In Step S614, the masking processing unit 124 executes the masking process on the concealment word of the print person.

On the other hand, in Step S611, similarly to Step S610, the concealment word managing unit 112 indicates the concealing setting screen as the user interface screen on the operation display unit 130 of the image forming apparatus 100. In Step S613, the concealment word managing unit 112 advances the process to Step S616 corresponding to the input to perform the masking process, and advances the process to Step S615 corresponding to the input not to perform the masking process.

In Step S615, the masking processing unit 124 executes the masking process only on the concealment word of the creator. In Step S616, the masking processing unit 124 executes the masking process on the concealment words of both the creator and the print person.

While the concealing setting screen is indicated in each setting of the concealment word of the creator and the concealment word of the print person, "perform masking" or "not perform masking" may be set on a part of options or every option at an initial setting for simplifying the setting operation.

In Step S620, the image forming unit 120 executes the image formation process to output the printed matter based on the document data on which the masking process has been performed as necessary. While this embodiment indicates the execution of the private print as the example, not limited to the private print, an ordinary print can be similarly processed using the creator ID information and the execution person ID information included in the print job.

Thus, in this embodiment, the security printing system 10 ensures the print with high security while appropriately concealing the concealment word that each user wants to be concealed even when the plurality of the users share the document file on the network. Furthermore, the security printing system 10 ensures appropriately calling attention of the user on the existence of the concealment word, thus improving confidentiality with the appropriate and facilitated method based on the authority of the creator and the print person.

Accordingly, the security printing system 10 ensures the facilitated protection of the confidential information of the creator and the print person on the print output without an integrated security management from the creation of the document file to the execution of the print. Additionally, the security printing system 10 uses the digital watermark and various codes to ensure restoring the concealment word based on the authority of the respective users.

The disclosure is configured to be executed with not only the above embodiment but also the following modifications.

Modification 1

While the plurality of the personal computers 200, the image forming apparatus 100, and the server 300 are used to configure the security printing system 10 in the above embodiment, a configuration may be employed such that, for example, the process executed in the server 300 is executed in the image forming apparatus 100 without using the server 300.

Modification 2

While the operation display unit 130 of the image forming apparatus 100 queries the user whether to mask the concealment word in the above embodiment, not limited to such method, for example, a masking result may be transmitted to the personal computer 200 of the user as the print execution person, so as to ensure a preview function. This ensures the print execution person to determine whether to mask the concealment word, for example, for each concealment region in the personal computer 200 while confirming the masking state.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system comprising:
    a concealment word registration unit that registers a concealment word associating with a user, the concealment word being desired to be concealed in an image formation process;
    an ID information acquisition unit that obtains creator ID information and execution person ID information from a print job, the creator ID information identifying a user as a creator of a document file, the document file being a target of the image formation process, the execution person ID information identifying a user as an execution person of the image formation process;
    a concealment word managing unit that uses the concealment words to determine a concealment region based on an input from the user identified by the execution person ID information, the concealment words including the concealment word associated with the user identified by the creator ID information and the concealment word associated with the user identified by the execution person ID information, the concealment region being a region to be concealed in an image, the image being generated using the print job; and
    an image forming unit that executes a masking process to form an image on which the masking process has been performed, the masking process making the concealment region illegible;
    wherein the concealment word managing unit indicates a user interface screen to make the determination corresponding to an input on the user interface screen when the authority of the user identified by the creator ID information is inferior to the authority of the user identified by the execution person ID information, the user interface screen querying whether to determine the region that indicates the concealment word associated with the user identified by the creator ID information to be the concealment region.

2. The image forming system according to claim 1, wherein the concealment word managing unit uses the concealment word associated with the user identified by the execution person ID information to determine the concealment region based on the input from the user identified by the execution person ID information when the creator ID information and the execution person ID information indicate an identical user.

3. The image forming system according to claim 1, wherein the concealment word managing unit forcibly determines a region as the concealment region when authority of the user identified by the creator ID information is superior to an authority of the user identified by the execution person ID information, the region indicating the concealment word associated with the user identified by the creator ID information.

4. The image forming system according to claim 1, further comprising
an image reading unit that reads an original image indicated on a document to generate original image data,
wherein the ID information acquisition unit obtains reader ID information that identifies a user as an execution person of reading the original image
the concealment word managing unit uses at least one of a predetermined code and a digital watermark to encrypt confidential information indicated on the concealment region and embed in the image, and the concealment word managing unit indicates a user interface screen that queries whether to restore the concealment word associated with the user having the authority inferior to authority of the user identified by the reader ID information among the embedded information, and the concealment word managing unit performs the restoration corresponding to an input on the user interface screen.

5. An image forming apparatus available for the image forming system according to claim 1, comprising
a concealment word registration unit that registers the concealment word associating with a user, the concealment word being desired to be concealed in the image formation process.

6. An image forming method, comprising:
registering a concealment word associating with a user, the concealment word being desired to be concealed in an image formation process;
obtaining creator ID information and execution person ID information from a print job, the creator ID information identifying a user as a creator of a document file, the document file being a target of the image formation process, the execution person ID information identifying a user as an execution person of the image formation process;
using the concealment words to determine a concealment region based on an input from the user identified by the execution person ID information, the concealment words including the concealment word associated with the user identified by the creator ID information and the concealment word associated with the user identified by the execution person ID information, the concealment region being a region to be concealed in an image, the image being generated using the print job; and
executing a masking process to form an image on which the masking process has been performed, the masking process making the concealment region illegible;
wherein a user interface screen is indicated to make the determination corresponding to an input on the user interface screen when the authority of the user identified by the creator ID information is inferior to the authority of the user identified by the execution person ID information, the user interface screen querying whether to determine the region that indicates the concealment word associated with the user identified by the creator ID information to be the concealment region.

7. A non-transitory computer-readable recording medium storing an image formation program to control an image forming apparatus, the image formation program causing the image forming apparatus to function as:
a concealment word registration unit that registers a concealment word associating with a user, the concealment word being desired to be concealed in an image formation process;
an ID information acquisition unit that obtains creator ID information and execution person ID information from a print job, the creator ID information identifying a user as a creator of a document file, the document file being a target of the image formation process, the execution person ID information identifying a user as an execution person of the image formation process;
a concealment word managing unit that uses the concealment words to determine a concealment region based on an input from the user identified by the execution person ID information, the concealment words including the concealment word associated with the user identified by the creator ID information and the concealment word associated with the user identified by the execution person ID information, the concealment region being a region to be concealed in an image, the image being generated using the print job; and
an image forming unit that executes a masking process to form an image on which the masking process has been performed, the masking process making the concealment region illegible;
wherein the concealment word managing unit indicates a user interface screen to make the determination corresponding to an input on the user interface screen when the authority of the user identified by the creator ID information is inferior to the authority of the user identified by the execution person ID information, the user interface screen querying whether to determine the region that indicates the concealment word associated with the user identified by the creator ID information to be the concealment region.

\* \* \* \* \*